United States Patent
Scholte

(10) Patent No.: US 8,959,629 B2
(45) Date of Patent: Feb. 17, 2015

(54) PRESERVING WEB DOCUMENT INTEGRITY THROUGH WEB TEMPLATE LEARNING

(75) Inventor: Theodoor Scholte, Antibes (FR)

(73) Assignee: SAP SE, Walldorf (DE)

( * ) Notice: Subject to any disclaimer, the term of this patent is extended or adjusted under 35 U.S.C. 154(b) by 84 days.

(21) Appl. No.: 13/547,808

(22) Filed: Jul. 12, 2012

(65) Prior Publication Data

US 2014/0020093 A1    Jan. 16, 2014

(51) Int. Cl.
  H04L 29/06    (2006.01)
  G06F 21/00    (2013.01)
  G06F 21/52    (2013.01)
(52) U.S. Cl.
  CPC ............ *H04L 63/1483* (2013.01); *G06F 21/52* (2013.01)
  USPC .......................................................... 726/22
(58) Field of Classification Search
  None
  See application file for complete search history.

(56) References Cited

U.S. PATENT DOCUMENTS

2008/0034424 A1*   2/2008   Overcash et al. ............... 726/22

OTHER PUBLICATIONS

Balduzzi, et al, "Automated discovery of parameter pollution vulnerabilities in web applications", NDSS'11, 8th Annual Network and Distributed System Security Symposium, Feb. 6-9, 2011, 16 pages.
Balzarotti, et al, "Saner: composing static and dynamic analysis to validate sanitization in web applications", Proceedings of the IEEE Symposium on Security and Privacy, May 2008, 15 pages.
Bates, et al, "Regular Expressions Considered Harmful in Client-Side XSS Filters", Proceedings of the 19th international conference on World Wide Web, 2010, 9 pages.
Buttler, "A short survey of document structure similarity algorithms", International Conference on Internet Computing, 2004, pp. 3-9.
Cadar, et al, "KLEE: Unassisted and Automatic Generation of High-Coverage Tests for Complex Systems Programs", Proceedings of the 8th USENIX conference on Operating Systems Design and Implementation, 2008, pp. 209-224.
Dhamankar, et al, "The top cyber security risks", http://www.sans.org/top-cyber-security-risks/, Sep. 2009, 15 pages.
Van Gundy, et al, "Noncespaces: Using randomization to enforce information flow tracking and thwart cross-site scripting attacks", Proceedings of the Network and Distributed System Security Symposium, Feb. 8-11, 2009, 18 pages.
Haldar, et al, "Dynamic taint propagation for java", Proceedings of the 21st Annual Computer Security Applications Conference, 2005, pp. 303-311.

(Continued)

*Primary Examiner* — Gilberto Barron, Jr.
*Assistant Examiner* — Simon Kanaan
(74) *Attorney, Agent, or Firm* — Brake Hughes Bellermann LLP

(57) ABSTRACT

The embodiments provide a runtime validation apparatus including a runtime interceptor configured to intercept a server request for a requested web resource and a response including response data, and an output validation policy identifier configured to identify an output validation policy from a database storing a plurality of output validation policies based on the requested web resource. The identified output validation policy may represent a template that encompasses allowed responses for the requested web resource. The runtime validation apparatus may further include a validation evaluator configured to compare the response data with the template, and a validation controller configured to permit the response to be transmitted if the response data complies with the template and block the response if at least a portion of the response data does not comply with the template.

17 Claims, 4 Drawing Sheets

(56) References Cited

OTHER PUBLICATIONS

Halfond, et al, "Precise Interface Identification to Improve Testing and Analysis of Web Applications", Proceedings of the ACM SIGSOFT International Symposium on Software Testing and Analysis, Jul. 2009, 11 pages.
Halfond, et al, "AMNESIA: Analysis and Monitoring for Neutralizing SQL-Injection Attacks", Proceedings of the IEEE and ACM International Conference on Automated Software Engineering, Nov. 2005, 10 pages.
Hooimeijer, et al, "Fast and precise sanitizer analysis with BEK", In Proceedings of the 20th USENIX conference on Security, 2011, 16 pages.
Huang, et al, "Securing web application code by static analysis and runtime protection", Proceedings of the 13th international conference on WWW, May 2004, pp. 40-52.
Jim, et al, "Defeating script injection attacks with browser-enforced embedded policies", Proceedings of the 16th international conference on World Wide Web, Session: Defending Against Emerging Threats, 2007, pp. 601-610.
Johns, et al, "Secure code generation for web applications", ESSoS, vol. 5965 of Lecture Notes in Computer Science, 2010, pp. 96-113.
Johns, et al, "XSSDS: Server-Side Detection of Cross-site Scripting Attacks", Proceedings of the 2008 Annual Computer Security Applications Conference, 2008, pp. 335-344.
Jovanovic, et al, "Pixy: A static analysis tool for detecting web application vulnerabilities (short paper)", Proceedings of the 2006 IEEE Symposium on Security and Privacy, 2006, pp. 258-263.
Kang, "Dom-based web pages to determine the structure of the similarity algorithm", 2009 Third International Symposium on Intelligent Information Technology Application, Nov. 2009, pp. 245-248.
Kiezun, et al, "HAMPI: A solver for string constraints", Proceedings of the 2009 International Symposium on Software Testing and Analysis, Jul. 21-23, 2009, pp. 105-116.
Kiezun, et al, "Automatic creation of SQL injection and cross-site scripting attacks", Proceedings of the 31st International Conference on Software Engineering, May 20-22, 2009, 11 pages.
Kirda, et al, "Noxes: a clientside solution for mitigating cross-site scripting attacks", Proceedings of the 2006 ACM symposium on Applied computing, 2006, pp. 330-337.
Kosuga, et al, "Sania: Syntactic and semantic analysis for automated testing against SQL injection", ACSAC, 2007, pp. 107-117.
Livshits, et al, "Using web application construction frameworks to protect against code injection attacks", Proceedings of the 2007 workshop on Programming languages and analysis for security, 2007, pp. 95-104.
Livshits, et al, "Finding security Vulnerabilities in Java Applications with static analysis", Proceedings of the 14th Usenix Security Symposium, Aug. 2005, 16 pages.
Louw, et al, "Blueprint: Robust prevention of cross-site scripting attacks for existing browsers", Proceedings of the 2009 30th IEEE Symposium on Security and Privacy, May 2009, pp. 331-346.
Martin, et al, "2010 cwe/sans top 25 most dangerous software errors", http://cwe.mitre.org/top25/, 2010, 41 pages.
Microsoft, "MSDN code analysis team blog", http://blogs.msdn.com/b/codeanalysis/, 2010, 3 pages.
Nadji, et al, "Document structure integrity: A robust basis for cross-site scripting defense", Proceedings of the Network and Distributed System Security Symposium, Feb. 8-11, 2009, 20 pages.
Newsome, et al, "Dynamic taint analysis for automatic detection, analysis, and signature generation of exploits on commodity software", NDSS, The Internet Society, 2005, 17 pages.
Nguyen-Tuong, et al, "Automatically hardening web applications using precise tainting", SEC, 2005, 12 pages.
OWASP, "Owasp top 10—2010, the ten most critical web application security risks", 2010, 2 pages.
Pietraszek, et al, "Defending against injection attacks through context-sensitive string evaluation", RAID, vol. 3858 of Lecture Notes in Computer Science, 2005, pp. 124-145.

Bisht, et al, "NoTamper: Automatic Blackbox Detection of Parameter Tampering Opportunities in Web Applications", Proceedings of the 17th ACM conference on Computer and communications security, 2010, 12 pages.
Robertson, et al, "Static enforcement of web application integrity through strong typing", Proceedings of the 18th conference on USENIX security symposium, 2009, pp. 283-298.
Yu, et al, "Better abstractions for secure server-side scripting", Proceeding of the 17th international conference on World Wide Web, Apr. 2008, pp. 507-516.
Samuel, et al, "Context-sensitive auto-sanitization in web templating languages using type qualifiers", Proceedings of the 18th ACM conference on Computer and communications security, 2011, pp. 587-600.
Saxena, et al, "A symbolic execution framework for javascript", Proceedings of the 2010 IEEE Symposium on Security and Privacy, 2010, pp. 513-528.
Saxena, et al, "Scriptgard: Automatic context-sensitive sanitization for large-scale legacy web applications", Proceedings of the Conference on Computer and Communications Security, Oct. 2011, 14 pages.
Xie, et al, "Static detection of security vulnerabilities in scripting languages", Proceedings of the 15th conference on USENIX Security Symposium, 2006, 14 pages.
Scholte, et al, "Quo Vadis? A Study of the Evolution of Input Validation Vulnerabilities in Web Applications", Proceedings of the International Conference on Financial Cryptography and Data Security, 2011, 15 pages.
Scott, et al, "Abstracting application-level web security", Proceedings of the 11th international conference on World Wide Web, 2002, 14 pages.
Su, et al, "The essence of command injection attacks in web applications", Conference Record of the 33rd ACM SIGPLAN-SIGACT symposium on Principles of programming languages, 2006, pp. 372-382.
Vikram, et al, "Ripley: automatically securing web 2.0 applications through replicated execution", Proceedings of the 16th ACM conference on Computer and communications security, 2009, pp. 173-186.
Vogt, et al, "Cross site scripting prevention with dynamic data tainting and static analysis", Proceedings of 14th Annual Network and Distributed System Security Symposium, 2007, 12 pages.
W3Counter, "Web browser market share trends", http://www.w3counter.com/trends, 2011, 1 page.
Wassermann, et al, "Sound and Precise Analysis of Web Applications for Injection Vulnerabilities," Proceedings of the ACM SIGPLAN 2007 Conference on Programming Language Design and Implementation, Jun. 2007, 10 pages.
Wassermann, et al, "Static Detection of Cross-Site Scripting Vulnerabilities", Proceedings of the 30th International Conference on Software Engineering, May 2008, 10 pages.
"Nagios", http://nagios.sourceforge.net, 2009, 3 pages.
"UML 2.0 Superstructure Specification", Technical report, Object Management Group (OMG), Aug. 2003, 637 pages.
"AndroMDA", http://andromda.org/, retrieved on Jun. 17, 2009, 3 pages.
Best, et al, "Model-based security engineering of distributed information systems using UMLsec", Proceedings of the 29th international conference on Software Engineering, 2007, pp. 581-590.
Ekelhart, et al, "Security ontologies: Improving quantitative risk analysis", Proceedings of the 40th Annual Hawaii International Conference on System Sciences, 2007, 7 pages.
Fenz, et al, "Information security fortication by ontological mapping of the iso/iec 27001 standard", Proceedings of the 13th Pacific Rim International Symposium on Dependable Computing, 2007, pp. 381-388.
Jung, et al, "Architectural assertions: Checking architectural constraints at run-time", Software Engineering Research and Practice, TR #07-18, Apr. 2007, 5 pages.
Juerjens, "Model-based run-time checking of security permissions using guarded objects", Lecture Notes in Computer Science vol. 5289, 2008, pp. 36-50.

* cited by examiner

PRESERVING WEB DOCUMENT INTEGRITY THROUGH WEB TEMPLATE LEARNING

BACKGROUND

Web applications have become an integral part of the daily lives of millions of users. Unfortunately, web applications are also frequently targeted by attackers, and critical vulnerabilities such as Cross-site scripting (XSS) are still common. Conventional approaches for mitigating XSS vulnerabilities include static analysis to locate vulnerabilities in the application's source code and web programming languages or frameworks that are able to automatically generate secure web applications. In particular, these conventional approaches may include static code analysis, dynamic tainting, a combination of dynamic tainting and static analysis, prevention by construction or by design, and enforcement mechanisms that are executed in conjunction the web browser. However, despite these approaches, XSS attacks may be still prevalent in today's web applications.

For example, XSS vulnerabilities may manifest as a failure to preserve the integrity of Hyper Text Markup Language (HTML) documents in the presence of untrusted input to the web applications. An XSS vulnerability may allow an attacker to inject dangerous HTML elements including malicious client-side code. In this context, one approach for preventing the exploitation of XSS vulnerabilities is the sanitization of untrusted data. In this approach, sanitizers are applied to user data such that dangerous constructs cannot be injected into the HTML documents. However, such sanitizers need to be properly placed in their appropriate context as well as in the correct order to operate effectively, which may be considered a difficult task. Another approach to prevent XSS vulnerabilities is the use of output validators. Output validation involves checking whether or not the output of the web application conforms to a certain specification. However, manually applying output validators may be difficult and error prone.

SUMMARY

The embodiments provide a runtime validation apparatus for applying a validation policy to output of an application during runtime in order to prevent an attack. The runtime validation apparatus may include a runtime interceptor configured to intercept a server request for a requested web resource and a response including response data, and an output validation policy identifier configured to identify an output validation policy from a database storing a plurality of output validation policies based on the requested web resource. The identified output validation policy may represent a template that encompasses allowed responses for the requested web resource. The runtime validation apparatus may further include a validation evaluator configured to compare the response data with the template, and a validation controller configured to permit the response to be transmitted if the response data complies with the template and block the response if at least a portion of the response data does not comply with the template.

The server request may be a Hypertext Transfer Protocol (HTTP) request and the response may be a HTTP response. In one embodiment, the output validation policy identifier configured to identify an output validation policy from a database storing a plurality of output validation policies based on the requested web resource may include selecting the output validation policy from the database corresponding to the requested web resource.

The template may include a document structure and at least one dynamic portion, and the validation evaluator configured to compare the response data with the template may include comparing the response data with the document structure and comparing the response data with the at least one dynamic portion if a structure of the response data is same as the document structure.

According to an embodiment, the validation controller may permit the response to be transmitted if the response data complies with the at least one dynamic portion and block the response if the at least a portion of the response data does not comply with the at least one dynamic portion.

Each dynamic portion may be assigned a data type, where comparing the response data with the at least one dynamic portion may include determining whether a portion of the response data has the data type corresponding to a respective dynamic portion. According to one example, the data type may be one of an integer, word, and Boolean.

The embodiments also provide an output analysis system for generating output validation policies to be applied to an output of an application in order to prevent attacks. The output analysis system may include an extraction unit configured to intercept server requests and responses between a client device and an application executing on a server during a testing phase of the application. The extracting unit may include at least one parser configured to parse the server requests and the responses to extract requested web resources and response data from the server requests and responses. The output analysis system may further include an analysis and training unit configured to determine a plurality of output validation policies for the requested web resources based on the response data and the requested web resources during the testing phase, where each output validation policy may represent a template that encompasses allowed responses for a corresponding web resource, and a validation engine configured to evaluate responses during runtime of the application based on the plurality of output validation policies and control the responses based on an outcome of the evaluation.

The analysis and training unit may include a document structure determining unit configured to determine a template structure based on the response data of the responses for the corresponding web resource, a dynamic portion determining unit configured to determine one or more dynamic portions of the template based on the response data of the responses for the corresponding web resource, and a data type determining unit configured to determine a data type for each dynamic portion.

The data type determining unit configured to determine a data type for each dynamic portion may include a plurality of validators, where each validator represents a corresponding data type, and each validator is configured to receive response data corresponding to a dynamic portion for the corresponding web resource and increment a value if the response data meets a constraint specified by the data type. The data type determining unit may be configured to determine the data type for the dynamic portion by selecting a validator having a highest value. The data type may be one of an integer, word, and Boolean.

The validation engine configured to evaluate responses during runtime of the application based on the output validation policies and control the responses based on an outcome of the evaluation may include a runtime interceptor configured to intercept a server request for a requested web resource and a response including response data, and an output validation policy identifier configured to identify an output validation policy from the plurality of output validation policies based on the requested web resource. The identified output validation policy may represent a template that encompasses allowed responses for the requested web resource. The validation engine may further include a validation evaluator configured to compare the response data with the template, and a validation controller configured to permit the response to be transmitted if the response data complies with the template and block the response if at least a portion of the response data does not comply with the template.

The template may include a document structure and at least one dynamic portion, and the validation evaluator configured to compare the response data with the template may include comparing the response data with the document structure and comparing the response data with the at least one dynamic portion if a structure of the response data is same as the document structure.

The validation controller may be configured to permit the response to be transmitted if the response data complies with the at least one dynamic portion and block the response if the at least a portion of the resource data does not comply with the at least one dynamic portion.

Each dynamic portion may be assigned a data type, where comparing the response data with the at least one dynamic portion may include determining whether a portion of the response data has the data type corresponding to a respective dynamic portion.

The embodiments also provide a method for generating output validation policies to be applied to an output of an application in order to prevent attacks performed by one or more processors. The method may include intercepting server requests and responses between a client device and an application executing on a server during a testing phase of the application, parsing the server requests and the responses to extract requested web resources and response data from the server requests and responses, determining a plurality of output validation policies for the requested web resource based on the response data and the requested web resources during the testing phase, where each output validation policy may represent a template that encompasses allowed responses for a corresponding web resource, evaluating responses during runtime of the application based on the plurality of output validation policies, and controlling the responses based on an outcome of the evaluation.

The determining step may include determining a document structure of the template based on the response data of the responses for the corresponding web resource, determining one or more dynamic portions of the template based on the response data of the responses for the corresponding web resource, and determining a data type for each dynamic portion. The data type may be one of an integer, word, and Boolean.

The evaluating step may further include intercepting a server request for a requested web resource and a response including response data, identifying an output validation policy from the plurality of output validation policies based on the requested web resource, where the identified output validation policy may represent a template that encompasses allowed responses for the requested web resource, and comparing the response data with the template. The controlling step may further include permitting the response to be transmitted if the response data complies with the template and blocking the response if at least a portion of the response data does not comply with the template.

The template may include a document structure and at least one dynamic portion, and the comparing the response data with the template may include comparing the response data with the document structure, and comparing the response data with the at least one dynamic portion if a structure of the response data is same as the document structure.

The details of one or more implementations are set forth in the accompanying drawings and the description below. Other features will be apparent from the description and drawings, and from the claims.

DETAILED DESCRIPTION

Embodiments provide a mechanism that automatically and transparently augments web application development and runtime environments such that the security of web applications is improved, thereby preventing XSS attacks. This mechanism may operate transparently to developers and may automatically secure web application runtime environments. According to one aspect, in the testing phase of a web application, the behavior of the web application is simulated, and the traffic between a web client and web application is intercepted and stored in a database. A training phase determines the possible or allowed responses that correspond to a requested resource. The result of the transiting phase is a set of output validation policies that are enforced at runtime. These and other features of the embodiments are further discussed with reference to the following figures.

Figure 1:
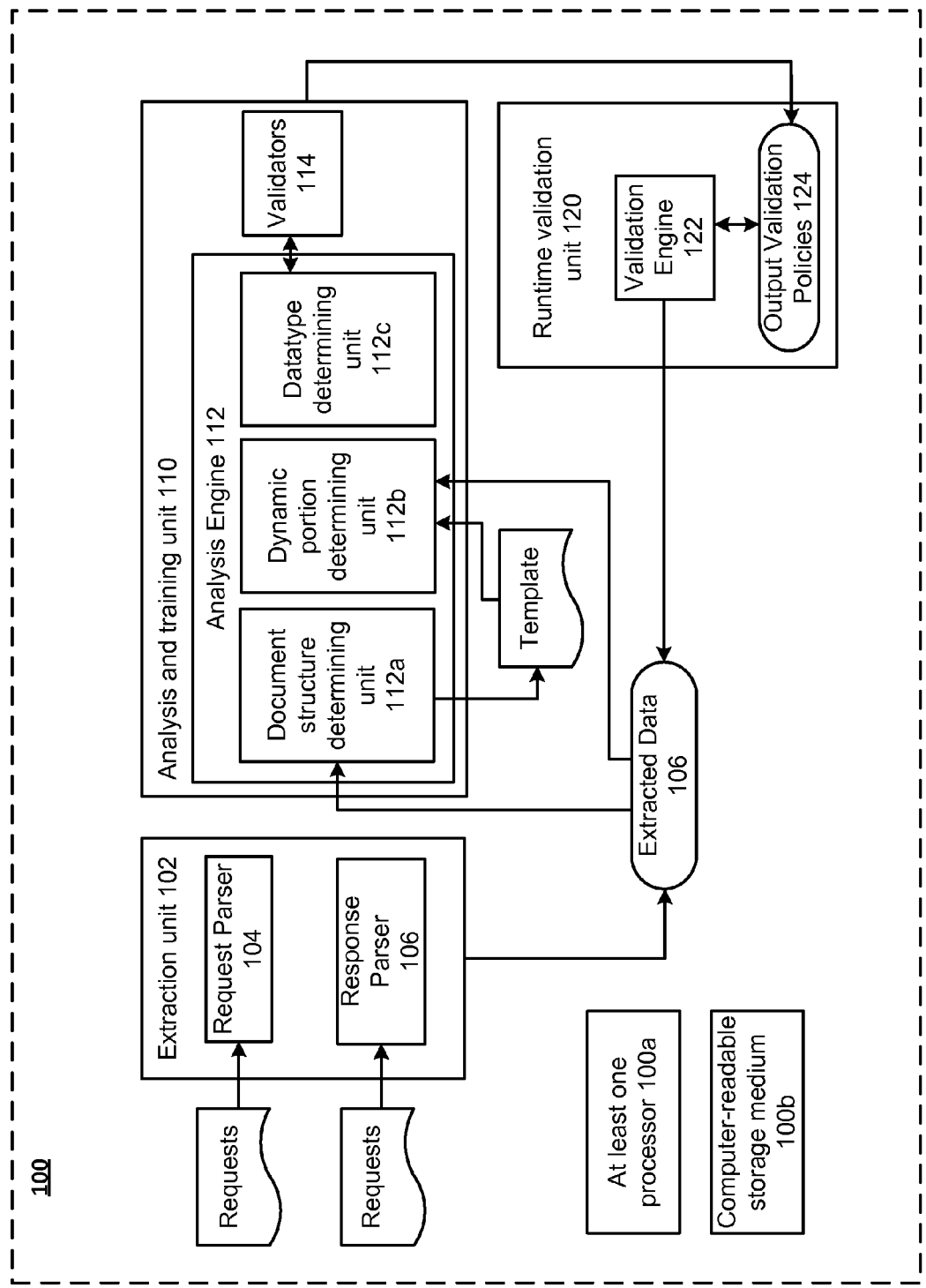
FIG. 1 illustrates a system for preventing attacks according to an embodiment.

FIG. 1 illustrates a system 100 for preventing attacks according to an embodiment. The system 100 may include an extraction unit 102 for extracting data between a client device and an application, a database 108 for storing the extracted data, an analysis and training unit 110, and a runtime validation unit 120. As shown in FIG. 1, the system 100 may include at least one processor 100*a* and a computer-readable storage medium 100*b*. Thus, the computer readable storage medium 100*b* may be configured to store instructions which, when executed by the at least one processor 100*a*, results in execution of the system 100 and associated operations thereof. Also, it is understood any functionalities associated with the subcomponents of the system 100 may executed with the use of one or more processors 101*a* and computer-readable storage mediums 100*b*. Generally, the prevention of XSS attacks encompasses three major phrases—document extraction, template and type learning, and runtime enforcement, as further explained below.

With respect to the document extraction phase, the extraction unit 102 may be configured to intercept server requests and responses between a client device and an application executing on a server during a testing phase of the application. The testing phase may utilize any type of simulation program that simulates the operation of a particular application such as the receiving of various types of server requests from client devices, the processing of the server requests by the application, and the transmitting of responses from the server to the client devices. In particular, during the testing phase of the application, the extraction unit 102 may intercept traffic between the client device and the application such as Hypertext Transfer Protocol (HTTP) traffic.

The application may be any type of application such as any commonly known web applications, which are capable of operating on one or more physical hosts such as an application server and/or database server. The client device may be any type of device capable of connecting to the application via a network such as the public Internet or any type of private network. The exchange of traffic between the client device and the application via a network is well known to one of ordinary skill in the art, and only those aspects which are relevant to the embodiments will be discussed herein.

The extraction unit 102 may include a request parser 104 and a response parser 106. The request parser 104 may be configured to parse the server requests and the response parser 106 may be configured to parse the server responses. Although the request parser 104 and the response parser 106 are illustrated as separate components, the request parser 104 and the response parser 106 may be embodied into one component or any number of components.

As known in the art, a HTTP request is a request message from a client to a server, which generally includes a source Internet Protocol (IP) address, port and proxy, IP address of the client device, destination IP address, port, host and protocol, requested uniform resource locator (URL), request method and content, user agent, connection control, and/or cookie parameters, among others, for example. The URL may be a reference to a resource as an HTML document, or more generally, a file or server-side script. A HTTP response is a response message from a server to a client, which generally includes a message header having a field name value pair, and a message body having response data which may be considered the payload of the response. For instance, the response data may include one or more HTTP documents. According to the embodiments, during the testing phase of an application, the request parser 104 and the response parser 106 may parse the server requests and responses to extract the requested resources, the response data (e.g., the payload of the response), cookie parameters, and/or the value-pairs, among others, for example. The extracted items may be stored in the database 108.

With respect to the template and learning phase, the analysis and training unit 110 may be configured to determine a plurality of output validation policies for the requested resources based on the response data and the requested resources during the testing phase. Each output validation policy may represent a template that encompasses allowed responses for a corresponding resource (also referred to as web resource). In other words, the output validation policy may be a template that covers all (or substantially all) the allowed responses for a requested resource. Each output validation policy may correspond to a different requested resource, and may represent the allowed responses for that particular requested resource. As such, the goal of the template and type learning phase is to construct an output validation policy for each requested web resource to be enforced during runtime of the application.

As web applications typically generate web documents dynamically, the response data depends on the requested resource, the input to the application and the computations performed by the web application. However, certain parts of the response data may be static, e.g., they only depend on the requested resource. According to the embodiments, an output validation policy may distinguish between static and dynamic outputs. Therefore, the template (also referred to as web template) may include a document structure (e.g., representing the static portions) and one or more dynamic portions. Generally, the dynamic portions may be the portions of the response that may change for each server request for a particular web resource. In other words, the dynamic portions may be considered dependent on the computations performed by the application and/or the input provided by the user. In other words, the dynamic portions may be considered placeholders, and the actual values of these placeholders are determined at runtime by the web application and depend on the input and/or the computations performed by the web application.

As further explained later in the disclosure, each dynamic portion may be assigned a data type by the analysis and training unit 110, which essentially places a restriction on the type of values allowed to appear in the response data, thereby ensuring the document integrity. These constraints are enforced at runtime by the runtime validation unit 120. In contrast, the static portions only depend on the web resource and would be the same for all responses corresponding to a given web resource.

At a high level, the analysis and training unit 110 may be configured to identify the document structure and the dynamic portions of the template for each requested resource, and then determine a data type for the dynamic portions. Based on this information, the analysis and training unit 110 may be configured to generate the plurality of output validation policies, and store these policies in an output validation policy database 124 of the runtime validation unit 120. The runtime validation unit 120 may apply the appropriate output validation policies during actual runtime of the application.

The analysis and training unit 110 may include an analysis engine 112 for determining a document structure and one or more dynamic portions of the template, and validators 114 for determining the data types of the dynamic portions in conjunction with the analysis engine 112. As further explained below, the analysis engine 112 may include a document structure determining unit 112*a*, a dynamic portion determining unit 112*b*, and a data type determining unit 112*c*.

The document structure determining unit 112*a* may be configured to determine the document structure of the template. In one example, the document structure determining unit 112*a* may determine the document structure by extracting the structure from a set of responses for the corresponding web resource according to a document structure algorithm. The document structure determining unit 112*a* may utilize any type of document structure algorithm known in the art.

According to one particular algorithm, for each requested web resource, the document structure determining unit 112*a* may analyze the corresponding responses from the database 108 and determine a set of tokens that appear in every response for the corresponding web resource. For example, for each web resource, the document structure determining unit 112*a* may compute equivalence classes, which may be a set of tokens having the same frequency of occurrence in every page in the set of responses. Then, for each token having the same name that occurs in every page in the set of responses, the document structure determining unit 112*a* may 1) determine the path from the root of the parse tree of the page to the element/token, and 2) determine that path from the nearest preceding equivalence class to the token. For each token analyzed above, if it has a different path from the root of the parse tree, the document structure determining unit 112*a* may compute the frequency of occurrence in every page in the set of responses and check if a token already belongs to an existing equivalence class or generate new equivalence class.

Then, the document structure determining unit 112a may generate a general template by 1) starting with the equivalence class whose tokens occur exactly once in every response, 2) determine the positions between consecutive tokens of the equivalence class, where a position is empty if the two tokens always occur contiguously, otherwise the position is non-empty, and 3) for non-empty positions, determine if an equivalence class occurs within it. If yes, the document structure determining unit 112a proceeds to 1). If not, the document structure determining unit 112a assigns a specific type (e.g., type B) to the template and computes the number of occurrences. Then, the document structure determining unit 112a constructs the document template from the general template by generating a mapping for each type constructor, obtained in the previous step, to an ordered set of strings. As a result, the document structure determining unit 112a may generate a plurality of document templates, where each document template corresponds to a different requested web resource.

The dynamic portion determining unit 112b may be configured to use the discovered template to extract the observed data values from the response data of the responses for the corresponding web resource. For example, the dynamic portion determining unit 112b may use the document template to extract the data values from the response data that correspond to a particular requested resource from the database 108. By analyzing the response data for a particular requested resource, the dynamic portion determining unit 112b may extract the parts of the response data are dynamic, e.g., the parts that change or are otherwise dependent on a computation performed by the application server.

The data type determining unit 112c may be configured to determine a data type for each dynamic portion. For example, after the dynamic portion determining unit 112b determines one or more dynamic portions for one or more requested web resources and extracts the observed data values for the particular dynamic portion, the data type determining unit 113c may determine and assign a data type to each dynamic portion, which may serve as a constraint during runtime enforcement of the output validation policies. In one example, the data type may include a Boolean expression, an integer, URL, token, word, words, and/or free-text. However, the embodiments encompass any kind of data type that may be envisioned by one of ordinary skill in the art. As shown below with respect to Table 1, each data type may correspond to a validator 114.

TABLE 1

| | Data Type | Validator |
|---|---|---|
| 1 | Boolean | (0\|1)\|(true\|false)\|(yes\|no) |
| 2 | Integer | (+\|−)?[0-9]+ |
| 3 | URL | RFC 2396, RFC 2732 |
| 4 | Token | static set of string literals |
| 5 | Word | [0-9a-zA-Z@ −]+ |
| 6 | Words | [0-9a-zA-Z@ − nrnnnt]+ |
| 7 | Free-Text | None |

Table 1 illustrates the plurality of validators 114, where each validator 114 corresponds to a data type. The validators 114 in Table 1 are listed from most restrictive to least restrictive with the last entry (e.g., Free-Text) being a catch-all category in the event that the dynamic portion does not correspond to any of the other data types. Each validator 114 may be considered an expression that represents the data type. For example, if the response data meets the expression provided by the validator 114, the response data is considered to be validated by that particular validator 114, and have the characteristic of the data type. According to an embodiment, for a given requested web resource, each validator 114 may be configured to receive response data corresponding to a dynamic portion and increment a value if the response data meets the expression specified by the validator 114. For example, each validator 114 may be associated with a score vector, and if the response data meets the expression provided by the validator, the score vector may be incremented, as further explained below.

The data type determining unit 112c may begin by transferring each value having the same location (e.g., placeholder) in each response data to every possible type of validator employed by the system, which may be one or more of the validators 114 described above. If a validator 114 accepts a value (e.g., it meets the expression provided by the validator 114), an entry in that validator's score vector is incremented by one. In the case that none of the validators 114 accepts a value, the data type determining unit 112c may assign the free-text type to the dynamic portion. Then, the data type determining unit 112c may be configured to determine the data type for the dynamic portion by selecting a validator 114 having a highest value. If there is a tie, the data type determining unit 112c may assign the most restrictive type according to the order to Table 1. By determining the document structure and the dynamic portions as well as the data type for the dynamic portions for each requested web resource, the templates are essentially constructed, which, as indicated above, represent the plurality of output validation policies. The plurality of output validation policies may be stored in the output validation policy database 124 to be enforced during runtime of the application. An example output validation policy is illustrated with respect to FIG. 2

Figure 2:
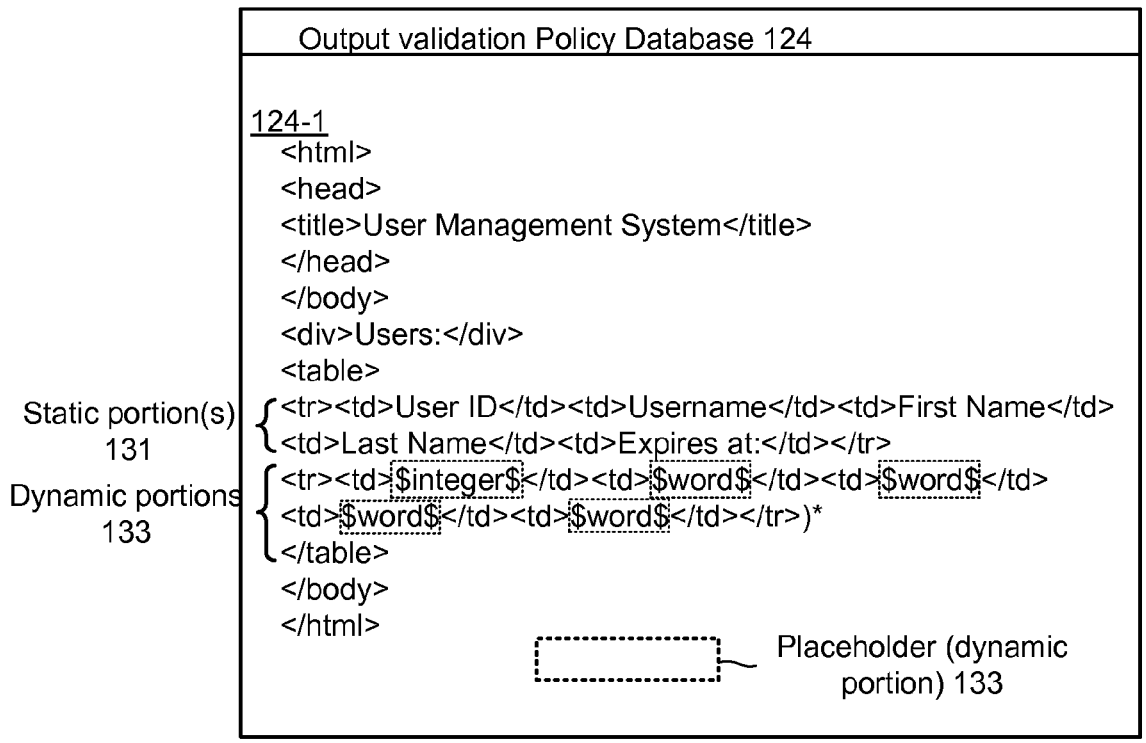
FIG. 2 illustrates an example output validation policy stored in an output validation policy database according to an embodiment.

FIG. 2 illustrates an example output validation policy 124-1 stored in the output validation policy database 124 according to an embodiment. As may be appreciated, the output validation policy database 124 may store a plurality of output validation policies. Each of the output validation policies may correspond to a different requested resource. As discussed in further detail below, when a server request is received during runtime of the application, the runtime validation unit 120 selects the appropriate output validation policy from the output validation policy database 124 that corresponds to the requested web resource of the server request. As shown in FIG. 2, the example output validation policy 124-1 may include one or more static portions 131 and one or more dynamic portions 133. Each dynamic portion 133 may be considered a placeholder, and is assigned a data type as determined by the data type determining unit 112c.

In FIG. 2, the dynamic portions 133 may be represented by <tr><td>$integer$</td><td>$word$</td><td>$word$</td><td>$word$</td><td>$word$</td></tr>). This is essentially a regular expression, which expresses that the table (which is part of the response) may contain one or more rows. The placeholders 133 for the values computed in the application are denoted by dollar signs ($$), and the data type to which the value(s) should correspond to is specified between the two dollar signs. The static portion 131 may be represented as <tr><td>User ID</td><td>Username</td><td>First Name</td><td>Last Name</td><td>Expires at:</td></tr>. The static portion 131 may represent the part of the response that does not change regardless of the server request, and may include a basic structure of the information presented in this part, or a recitation of the actual information that must be present. In other words, the one or more static portions 131 may represent the document structure. As shown by Table 1, the data types are modeled as regular expressions as well. It is noted that the example output validation policy 124-1 is merely an example, where the embodiments encompass any type of variation according to the techniques specified herein. The result of the first two phases is an output validation policy for each resource of the application under test.

Referring back to FIG. 1, in the runtime enforcement phase, the runtime validation unit 120 is configured to apply the appropriate validation policy to the output of the application in order to prevent an attack. For example, the runtime validation unit 120 may be configured to evaluate responses during runtime of the application based on the plurality of output validation policies and control the responses based on an outcome of the evaluation. In particular, when a server request for a requested web resource is received, the runtime validation unit 120 may be configured to select the appropriate output validation policy corresponding to the requested web resource, and then apply the template against the response data in order to determine if the response data complies with the template. If the response data complies with the template, the runtime validation unit 120 may be configured to permit the response to be transmitted to the client device. On the other hand, if at least a portion of the response data does not comply with the template, the runtime validation unit 120 may be configured to block the response.

In addition, the runtime validation unit 120 may include any other types of actions for controlling a behavior of the responses depending on the outcome of the evaluation such as modifying the response and/or sending an alert. As explained in greater detail below, the runtime validation unit 120 may include a validation engine 122 and the output validation policy database 124. The validation engine 122 may perform the actions associated with the evaluation and control mechanisms, and the output validation policy database 124 may store the plurality of output validation policies generated during the testing phase of the application.

Figure 3:
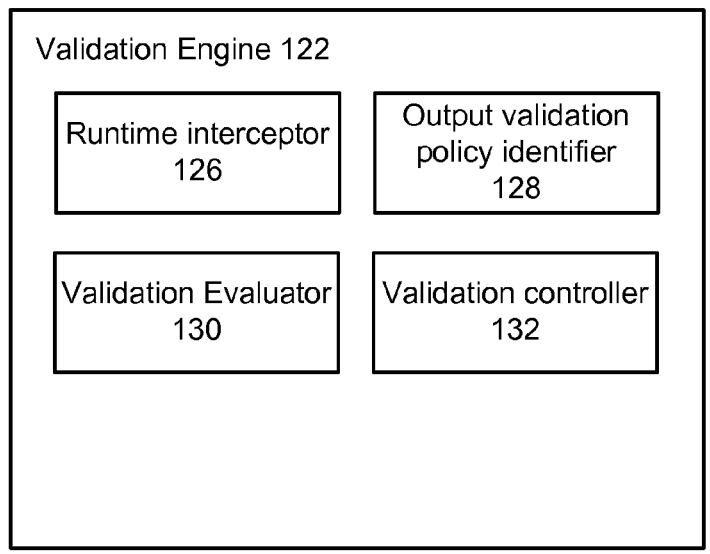
FIG. 3 illustrates a validation engine of FIG. 1 according to an embodiment.

FIG. 3 illustrates the validation engine 122 of FIG. 1 according to an embodiment. For example, the validation engine 122 may include a runtime interceptor 126, an output validation policy identifier 128, a validation evaluator 130 and a validation controller 132. The runtime interceptor 126 may be configured to intercept a server request for a requested web resource and its response including the response data. The runtime interceptor 126 may be configured to intercept the server requests and responses according to any type of interception technique known in the art. In one embodiment, the server requests and responses may be HTTP requests and responses.

The output validation policy identifier 128 may be configured to identify an output validation policy from the output validation policy database 124 based on the requested web resource. As indicated above, the output validation policy may represent a template that encompasses allowed responses for the requested web resource, and the template may include the document structure and at least one dynamic portion. In one example, the output validation policy identifier 128 may identify the appropriate output validation policy among the plurality of stored output validation policies by selecting the output validation policy from the output validation policy database 124 corresponding to the requested web resource. As indicated above, each output validation policy corresponds to a different web resource, and the output validation policy identifier 128 identifies the appropriate output validation policy by the requested web resource in the server request.

The validation evaluator 130 may be configured to compare the response data of the server response with the template corresponding to the selected output validation policy. For example, the validation evaluator 130 may compare a structure of the response data with the document template, which may include comparing the response with the one or more static portions. If the appropriate portion(s) of the response data corresponding to a location of the static portion(s) identified by the template is the same as the static portion(s), the validation evaluator 130 may then compare the appropriate portions(s) of the response data corresponding to a location of the dynamic portion(s) with the dynamic portions. As indicated above, each dynamic portion is assigned a data type, and the comparison of the dynamic portion(s) with the template may include determining whether or not portion(s) of the response has the data type specified by the template.

The validation controller 132 may be configured to control the responses based on an outcome of the comparisons. For example, the validation controller 132 may permit the response to be transmitted to the client device if the response data complies with the template, and the validation controller 132 may be configured to block the response if at least a portion of the response data does not comply with the template. In particular, if one or more portions of the response data corresponding to a location of the static portions are not the same as the static portion(s) of the template, the validation controller 132 may block the response. Also, if one or more portions of the response data correspond to a location of the dynamic portions do not comply with the dynamic portions, the validation controller 132 may block the response. For example, if the appropriate portions of the response do not have the data type specified by the template, then the validation controller 132 may determine that the response does not comply with the output validation policy. On the other hand, if the response data complies with the document structure and dynamic portions, the validation controller 132 may be configured to permit the response to be transmitted.

Figure 4:
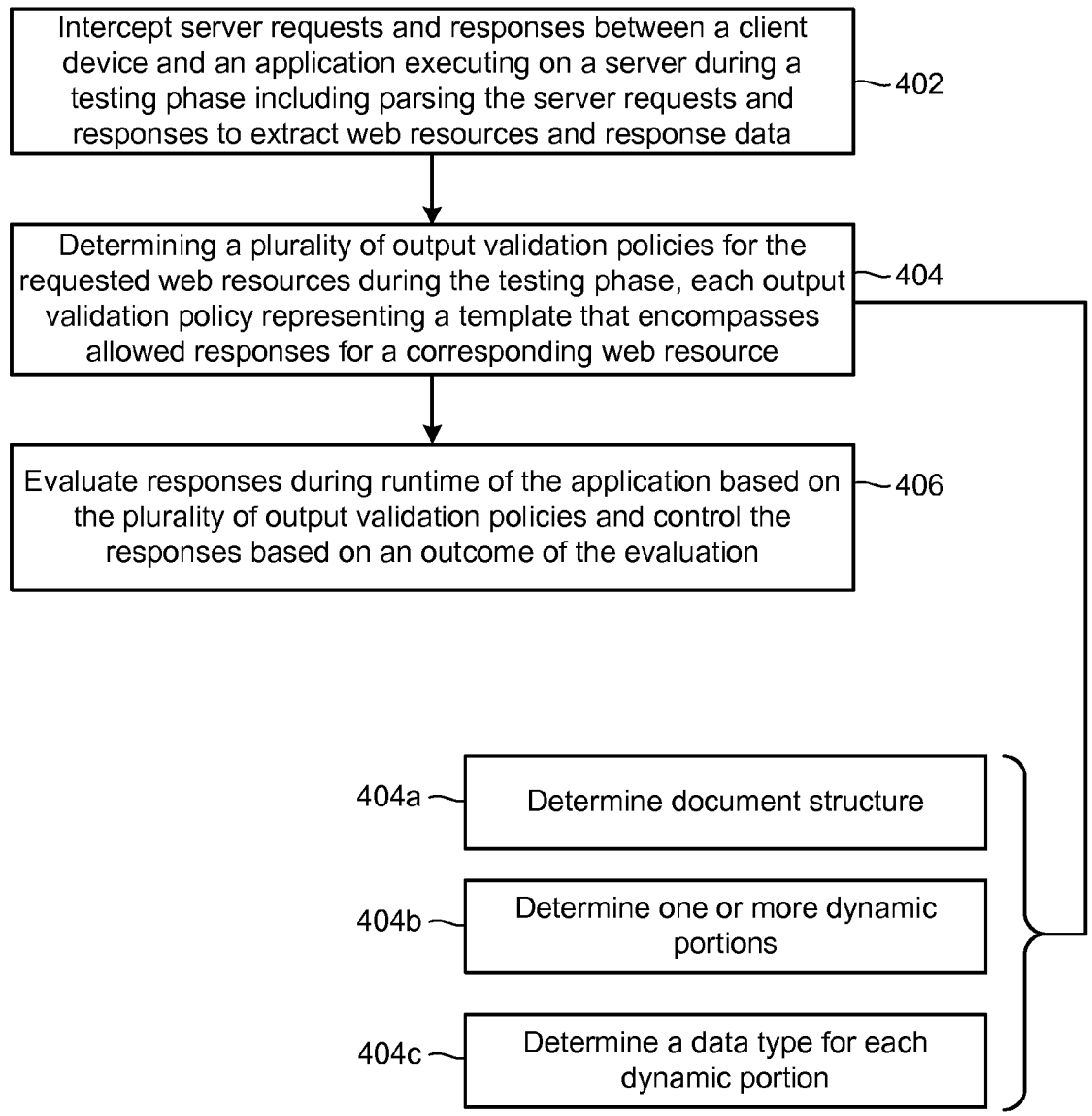
FIG. 4 is a flowchart illustrating example operations of generating output validation policies to be applied to an output of an application during runtime according to an embodiment.

FIG. 4 is a flowchart illustrating example operations of generating output validation policies to be applied to an output of an application during runtime according to an embodiment. Although FIG. 4 is illustrated as a sequential, ordered listing of operations, it will be appreciated that some or all of the operations may occur in a different order, or in parallel, or iteratively, or may overlap in time.

Server requests and responses may be intercepted between a client device and an application executing on a server during a testing phase, and the requests and responses may be parsed in order to extract the requested web resources and response data contained in the response (402). For example, the extraction unit 102 may be configured to intercept server requests and responses between a client device and an application executing on a server during a testing phase of the application. The testing phase may utilize any type of simulation program that simulates the operation of a particular application such as the receiving of various types of server requests, the processing of the server requests by the application, and the generating/transmitting of the responses by the application. In particular, during the testing phase of the application, the extraction unit 102 may intercept traffic between the client device and the application such the HTTP traffic. Also, the request parser 104 may be configured to parse the server requests and the response parser 106 may be configured to parse the server responses in order to extract the requested web resources and the response data contained in the responses.

A plurality of output validation policies may be determined for the requested web resources during the testing phase, where each output validation policy represents a template that encompasses allowed responses for a corresponding web resource (404). For example, the analysis and training unit 110 may be configured to determine a plurality of output validation policies for the requested resources based on the response data and the requested resources during the testing phase. In particular, the analysis and training unit 110 may receive the extracted items from the database 108 and analyze the responses data for each requested web resource in order to determine the plurality of output validation policies. Each output validation policy may represent a template that encompasses allowed responses for a corresponding resource (also referred to as web resource). In other words, the output validation policy may be a template that covers all (or substantially all) the allowed responses for a requested resource. Each output validation policy may correspond to a different requested resource, and may represent the allowed responses for that particular requested resource. According to one embodiment, the analysis and training unit 110 may determine an output validation policy for a given requested resource according to 404a, 404b and 404c, as further explained below.

A document structure of the template may be determined (404a). For example, the document structure determining unit 112a may be configured to determine the document structure of the template based on the response data of the responses for the corresponding web resource. In one example, the document structure determining unit 112a may determine similarities between the response data of the responses for the corresponding web resource. In particular, for each requested web resource, the document structure determining unit 112a may analyze the corresponding responses from the database 108 and determine the document structure by identifying similarities between the responses. By identifying the similarities between the response data, the document structure determining unit 112a may construct the one or more static portions 131 of the document template, e.g., the portion(s) that is/are the same for every response for a particular requested web resource. However, it is noted that the embodiments encompass any type of training mechanism that constructs a document structure based on a plurality of responses for a given requested web resource.

One or more dynamic portions may be determined (404b). For example, according to the embodiments, the dynamic portion determining unit 112b may be configured to determine one or more dynamic portions of the template based on the response data of the responses for the corresponding web resource. In particular, the dynamic portion determining unit 112b may analyze the response data from the database 108 that correspond to a particular requested resource. By analyzing the response data for a particular requested resource, the dynamic portion determining unit 112b can learn which parts of the response data are dynamic, e.g., the parts that change or are otherwise dependent on a computation performed by the application server.

A data type for each dynamic portion may be determined (404c). For example, the data type determining unit 112c may be configured to determine a data type for each dynamic portion. After the dynamic portion determining unit 112b determines one or more dynamic portions for each requested web resources, the data type determining unit 113c may determine and assign a data type to each dynamic portion, which may serve as a constraint during runtime enforcement of the output validation policies. In one example, the data type may include the data types illustrated in Table 1 such as a Boolean expression, an integer, URL, token, word, words, and/or free-text. However, the embodiments encompass any kind of data type that may be envisioned by one of ordinary skill in the art.

The data type determining unit 112c may begin by transferring each value having the same location (e.g., placeholder) in each response data to every possible type of validator employed by the system, which may be one or more of the validators 114 described above. If a validator 114 accepts a value (e.g., it meets the expression provided by the validator 114), an entry in that validator's score vector is incremented by one. In the case that none of the validators 114 accepts a value, the data type determining unit 112c may assign the free-type type to the dynamic portion. Then, the data type determining unit 112c may be configured to determine the data type for the dynamic portion by selecting a validator 114 having a highest value. If there is a tie, the data type determining unit 112c may assign the most restrictive type according to the order to Table 1. The output validation policies are then stored in the output validation database 124 to be enforced during runtime of the application, as further explained below.

Responses may be evaluated during runtime of the application based on the plurality of output validation policies, and the responses may be controlled based on an outcome of the evaluation (406). For example, the runtime validation unit 120 is configured to apply the appropriate validation policy to the output of the application in order to prevent an attack. The runtime validation unit 120 may be configured to evaluate responses during runtime of the application based on the plurality of output validation polices and control the responses based on an outcome of the evaluation.

In particular, when a server request for a requested web resource is received, the runtime validation unit 120 may be configured to select the appropriate output validation policy corresponding to the requested web resource, and then apply the template against the response data in order to determine if the response data complies with the template. If the response data complies with the template, the runtime validation unit 120 may be configured to permit the response to be transmitted to the client device. On the other hand, if at least a portion of the response data does not comply with the template, the runtime validation unit 120 may be configured to block the response. In addition, the runtime validation unit 120 may include any other types of action for controlling a behavior of the responses depending on the outcome of the evaluation such as modifying the response and/or sending an alert.

Figure 5:
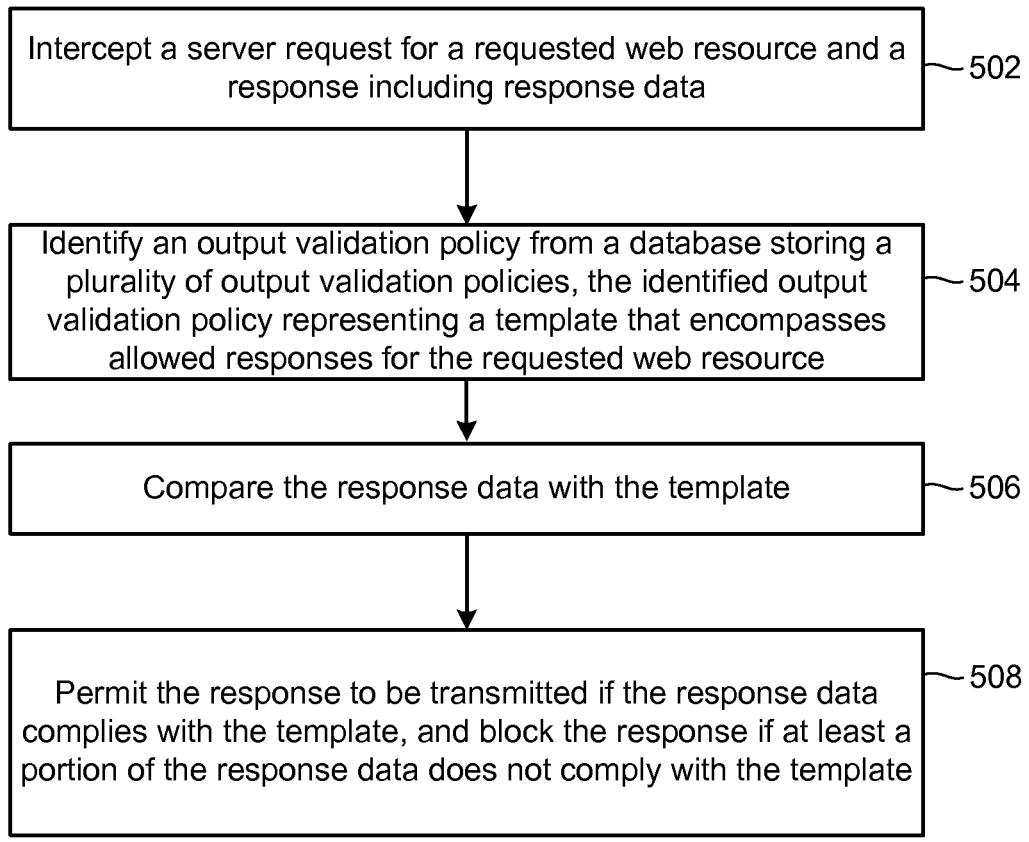
FIG. 5 is a flowchart illustrating example operations of applying a validation policy to output of an application during runtime according to an embodiment.

FIG. 5 is a flowchart illustrating example operations of applying a validation policy to output of an application during runtime according to an embodiment. Although FIG. 5 is illustrated as a sequential, ordered listing of operations, it will be appreciated that some or all of the operations may occur in a different order, or in parallel, or iteratively, or may overlap in time.

A server request for a requested web resource and a response that includes response data may be intercepted (502). For example, the runtime interceptor 126 may be configured to intercept a server request for a requested web resource and its response including the response data. An output validation policy may be identified from a database storing a plurality of output validation policies, where the identified output validation policy may represent a template that encompasses allowed responses for the requested web resource (504).

For example, the output validation policy identifier 128 may be configured to identify an output validation policy from the output validation policy database 124 based on the requested web resource. As indicated above, the output validation policy may represent a template that encompasses allowed responses for the requested web resource, and the template may include the document structure (e.g., at least one static portion) and at least one dynamic portion. In one example, the output validation policy identifier 128 may identify the appropriate output validation policy among the plurality of stored output validation policies by selecting the output validation policy from the output validation policy database 124 corresponding to the requested web resource. As indicated above, each output validation policy corresponds to a different web resource, and the output validation policy identifier 128 identifies the appropriate output validation policy by the requested web resource in the server request.

The response data may be compared with the template (506). For example, the validation evaluator 130 may be configured to compare the response data of the server response with the template corresponding to the selected output validation policy. The validation evaluator 130 may compare a structure of the response data with the document structure of the template. If the appropriate portion(s) of the response data corresponding to the document structure identified by the template is the same as the document structure of the response, the validation evaluator 130 may then compare the appropriate portions(s) of the response data corresponding to a location of the dynamic potion(s) with the dynamic portions. As indicated above, each dynamic portion is assigned a data type, and the comparison of the dynamic portion(s) with the template may include determining whether or not portion(s) of the response has the data type specified by the template.

The response may be permitted to be transmitted if the response data complies with the template, and the response may be blocked if at least a portion of the response data does not comply with the template (508). For example, the validation controller 132 may be configured to control the responses based on an outcome of the comparisons. The validation controller 132 may permit the response to be transmitted to the client device if the response data complies with the template, and the validation controller 132 may be configured to block the response if at least a portion of the response data does not comply with the template.

In particular, if the document structure of the response data corresponding are not the same as the template, the validation controller 132 may block the response. Also, if one or more portions of the response data correspond to a location of the dynamic portions do not comply with the dynamic portions, the validation controller 132 may block the response. For example, if the appropriate portions of the response do not have the data type specified by the template, then the validation controller 132 may determine that the response does not comply with the output validation policy. On the other hand, if the response data complies with the static and dynamic portions, the validation controller 132 may be configured to permit the response to be transmitted.

As a result, the embodiments encompass a mechanism to preserve the integrity of web documents. By learning the correct structure of the web documents subject to the requests and extracting a template, a relatively accurate output validation policy may be obtained, which is an effective mechanism for the prevention of XSS vulnerabilities. Further, this mechanism has a relatively high degree of automation and increases program security with minimal efforts. Also, it may help developers that are not aware of security issues to develop more secure web applications. Other benefits may include a modular integration of new security functionality without disrupting existing code. For example, in case of legacy software systems of which source code is not available or complicated to modify.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (e.g., the computer-readable storage medium 100*b*) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors (e.g., the at least one processor 100*a*) suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A runtime validation apparatus for applying a validation policy to output of an application during runtime in order to prevent an attack, the runtime validation apparatus comprising:
    at least one processor;
    a non-transitory computer-readable storage medium including instructions executable by the at least one processor, the instructions configured to implement,
    a runtime interceptor configured to intercept a server request for a requested web resource of the application from a client device to a server and a response to be transmitted from the server to the client device, the response including server response data generated by the server;
    an output validation policy identifier configured to identify an output validation policy from a database storing a plurality of output validation policies based on the requested web resource, the identified output validation policy representing a template that encompasses allowed server responses for the requested web resource, the template including a document structure identifying at least one static portion, the template identifying at least one dynamic portion, the at least one dynamic portion being assigned a data type;
    a validation evaluator configured to apply the identified output validation policy to an output of the application executing on the server including comparing the server response data with the template of the identified output validation policy to determine whether the server response data complies with the template of the identified output validation policy, the validation evaluator configured to compare the server response data with the template includes,
        first comparing a first portion of the server response data with the document structure, the first comparing including determining whether the at least one static portion of the template is equivalent to the first portion of the server response data,
        second comparing a second portion of the server response data with the at least one dynamic portion if the at least one static portion is determined as equivalent to the first portion of the server response data, the second comparing including determining whether the second portion of the server response data has the data type of the at least one dynamic portion; and
    a validation controller configured to permit the response to be transmitted to the client device if the response data complies with the template, the validation controller configured to block the response if at least a portion of the response data does not comply with the template.

2. The runtime validation apparatus of claim 1, wherein the server response data includes results of computations performed by the application executing on the server, and the validation evaluator is configured to compare the results of computations to the template to determine whether the results of computations meet constraints specified by the template.

3. The runtime validation apparatus of claim 1, wherein the output validation policy identifier configured to identify an output validation policy from a database storing a plurality of output validation policies based on the requested web resource includes:
    selecting the output validation policy from the database corresponding to the requested web resource.

4. The runtime validation apparatus of claim 1,
    wherein the validation controller is configured to permit the response to be transmitted to the client device if the second portion of the server response data has the data type of the at least one dynamic portion,
    wherein the validation controller is configured to block the response if the second portion of the server response data does not have the data type of the at least one dynamic portion.

5. The runtime validation apparatus of claim 1, wherein the at least one static portion represents a portion of the server response data that does not change, the at least one dynamic portion having the assigned data type representing a restriction on types of values allowed to appear in the server response data.

6. An output analysis system for generating output validation policies to be applied to an output of an application in order to prevent attacks, the output analysis system comprising:
    at least one processor;
    a non-transitory computer-readable storage medium including instructions executable by the at least one processor, the instructions configured to implement,
    an extraction unit configured to intercept server requests and responses between a client device and the application executing on a server during a testing phase of the application, the extracting unit including at least one parser configured to parse the server requests and the responses to extract requested web resources and response data from the server requests and responses;
    an analysis and training unit configured to determine a plurality of output validation policies for the requested web resources based on the response data and the requested web resources during the testing phase, each output validation policy representing a template that encompasses allowed responses for a corresponding web resource, the analysis and training unit including,
        a document structure determining unit configured to determine a template structure based on the response data of the responses for the corresponding web resource;
        a dynamic portion determining unit configured to determine at least one dynamic portion of the template based on the response data of the responses for the corresponding web resource; and
        a data type determining unit configured to determine a data type for the at least one dynamic portion; and
    a validation engine configured to evaluate responses during runtime of the application based on the plurality of output validation policies and control the responses based on an outcome of the evaluation.

7. The output analysis system of claim 6, wherein the data type determining unit configured to determine the data type for the at least one dynamic portion includes:
    a plurality of validators, each validator representing a corresponding data type;
    each validator configured to receive response data corresponding to the at least one dynamic portion for the corresponding web resource and increment a value if the response data meets a constraint specified by the data type; and the data type determining unit configured to determine the data type for the at least one dynamic portion by selecting a validator having a highest value.

8. The output analysis system of claim 6, wherein the data type is one of an integer, word, and Boolean.

9. The output analysis system of claim 6, wherein the validation engine configured to evaluate responses during runtime of the application based on the output validation policies and control the responses based on an outcome of the evaluation includes:
 a runtime interceptor configured to intercept a server request for a requested web resource and a response including response data;
 an output validation policy identifier configured to identify an output validation policy from the plurality of output validation policies based on the requested web resource, the identified output validation policy representing the template that encompasses allowed responses for the requested web resource;
 a validation evaluator configured to compare the response data with the template;
 a validation controller configured to permit the response to be transmitted if the response data complies with the template, the validation controller configured to block the response if at least a portion of the response data does not comply with the template.

10. The output analysis system of claim 9, wherein the validation evaluator configured to compare the response data with the template includes:
 comparing the response data with the template structure; and
 comparing the response data with the at least one dynamic portion if a structure of the response data is same as the template structure.

11. The output analysis system of claim 10, wherein the validation controller configured to permit the response to be transmitted if the response data complies with the template, and the validation controller configured to block the response if at least a portion of the response data does not comply with the template includes:
 permitting the response to be transmitted if the response data complies with the at least one dynamic portion; and
 blocking the response if the at least a portion of the resource data does not comply with the at least one dynamic portion.

12. The output analysis system of claim 10, wherein comparing the response data with the at least one dynamic portion includes determining whether a portion of the response data has the data type corresponding to a respective dynamic portion.

13. The output analysis system of claim 6, wherein the document structure determining unit is configured to compute equivalence classes by determining a set of tokens having a same frequency of occurrence in a set of responses for a web resource, the document structure determining unit configured to generate the document structure based on positions between tokens of an equivalence class.

14. A method for generating output validation policies to be applied to an output of an application in order to prevent attacks performed by one or more processors, the method comprising:
 intercepting server requests and responses between a client device and the application executing on a server during a testing phase of the application;
 parsing the server requests and the responses to extract requested web resources and response data from the server requests and responses;
 determining a plurality of output validation policies for the requested web resource based on the response data and the requested web resources during the testing phase, each output validation policy representing a template that encompasses allowed responses for a corresponding web resource, wherein the determining step includes determining a document structure of the template based on the response data of the responses for the corresponding web resource, determining at least one dynamic portion of the template based on the response data of the responses for the corresponding web resource, and determining a data type for the at least one dynamic portion;
 evaluating responses during runtime of the application based on the plurality of output validation policies; and
 controlling the responses based on an outcome of the evaluation.

15. The method of claim 14, wherein the data type is one of an integer, word, and Boolean.

16. The method of claim 14,
 wherein the evaluating step further includes:
  intercepting a server request for a requested web resource and a response including response data;
  identifying an output validation policy from the plurality of output validation policies based on the requested web resource, the identified output validation policy representing the template that encompasses allowed responses for the requested web resource; and
  comparing the response data with the template;
 wherein the controlling step further includes:
  permitting the response to be transmitted if the response data complies with the template and blocking the response if at least a portion of the response data does not comply with the template.

17. The method of claim 16, wherein the comparing the response data with the template includes:
 comparing the response data with the document structure; and
 comparing the response data with the at least one dynamic portion if a structure of the response data is same as the document structure.

* * * * *